US010263752B2

(12) United States Patent
Cho et al.

(10) Patent No.: US 10,263,752 B2
(45) Date of Patent: Apr. 16, 2019

(54) COMMUNICATION METHOD AND ELECTRONIC DEVICE FOR PERFORMING THE SAME

(71) Applicant: Samsung Electronics Co., Ltd., Suwon-si, Gyeonggi-do (KR)

(72) Inventors: Won Joon Cho, Seoul (KR); Sung Jin Park, Seoul (KR); Dae Ho Kang, Suwon-si (KR); Chang Won Nam, Seoul (KR); Hyung Yeol Lee, Seoul (KR); Chaiman Lim, Seoul (KR); Ki Tae Lee, Suwon-si (KR); Sun Min Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/824,939

(22) Filed: Nov. 28, 2017

(65) Prior Publication Data
US 2018/0152275 A1    May 31, 2018

(30) Foreign Application Priority Data
Nov. 28, 2016    (KR) .......................... 10-2016-0159635

(51) Int. Cl.
*H04W 72/04*      (2009.01)
*H04W 72/12*      (2009.01)
(Continued)

(52) U.S. Cl.
CPC .......... *H04L 5/0062* (2013.01); *H04L 5/0053* (2013.01); *H04L 27/0006* (2013.01); *H04W 72/0446* (2013.01); *H04W 72/1215* (2013.01)

(58) Field of Classification Search
CPC . H04L 5/0062; H04L 5/0053; H04L 27/0006; H04W 72/0446; H04W 72/1215; H04W 72/12; H04W 72/1263
See application file for complete search history.

(56) References Cited

U.S. PATENT DOCUMENTS 5,689,439 A * 11/1997 Weerackody .......... H04B 7/061
                                                    370/329
8,995,321 B2   3/2015 Medapalli
(Continued)

FOREIGN PATENT DOCUMENTS

EP         2540102 A2    1/2013
WO    2016006984 A1      1/2016

OTHER PUBLICATIONS

International Search Report and Written Opinion regarding International Application No. PCT/KR2017/013564, dated Feb. 13, 2018, 13 pages.

*Primary Examiner* — Marisol Figueroa

(57) ABSTRACT

An electronic device includes a first communication module, a second communication module, a memory, a processor configured to be electrically connected with the first communication module and the second communication module, and a memory. The processor is configured to verify a first data packet to be transmitted via the first communication module. The processor is also configured to obtain scheduling information of a second data packet received via the second communication module. The processor is also configured to adjust a time when transmission of the first data packet is started, based on the scheduling information.

20 Claims, 16 Drawing Sheets

(51) Int. Cl.
  *H04L 27/00* (2006.01)
  *H04L 5/00* (2006.01)

(56) References Cited

U.S. PATENT DOCUMENTS

| | | | |
|---|---|---|---|
| 2003/0087607 A1* | 5/2003 | Fraser | H04W 52/08 455/67.16 |
| 2008/0139200 A1* | 6/2008 | Zhu | H04W 16/14 455/426.1 |
| 2008/0304487 A1* | 12/2008 | Kotecha | H04L 12/66 370/392 |
| 2010/0271963 A1 | 10/2010 | Koorapaty et al. | |
| 2011/0019668 A1* | 1/2011 | Diab | H04L 47/564 370/389 |
| 2011/0205986 A1 | 8/2011 | Medapalli | |
| 2013/0272260 A1 | 10/2013 | Bitran et al. | |
| 2014/0029535 A1 | 1/2014 | Medapalli | |
| 2015/0207610 A1 | 7/2015 | Medapalli | |
| 2016/0037520 A1 | 2/2016 | Wang | |
| 2016/0066306 A1 | 3/2016 | Khawer et al. | |
| 2016/0073405 A1* | 3/2016 | Khawer | H04L 5/0007 370/329 |

* cited by examiner

COMMUNICATION METHOD AND ELECTRONIC DEVICE FOR PERFORMING THE SAME

CROSS-REFERENCE TO RELATED APPLICATION AND CLAIM OF PRIORITY

This application is related to and claims priority to Korean Patent Application No. 10-2016-0159635 filed on Nov. 28, 2016, the contents of which are incorporated herein by reference.

TECHNICAL FIELD

The present disclosure relates to a communication method using communication modules which use different protocols and an electronic device for performing the same.

BACKGROUND

Electronic devices, such as smartphones, may support access to a cellular network such as $3^{rd}$ generation (3G) or long term evolution (LTE). Recently, there has been a growing interest in a communication protocol which uses an unlicensed band for enhancing communication performance without incurring costs to obtain frequencies.

For example, research on licensed-assisted access using LTE (LAA), LTE-unlicensed (LTE-U), and the like as communication protocols which use an unlicensed band may be continuously carried out. In this regard, discussion about including LAA technology which uses LTE in an unlicensed band from release 13 as standard technology may actively conducted in $3^{rd}$ generation partnership project (3GPP).

SUMMARY

To address the above-discussed deficiencies, it is a primary object to provide an unlicensed band used in LTE-U technology and LAA technology may be overlapped in a considerable portion with a band (e.g., 5 GHz) used in wireless-fidelity (Wi-Fi) technology. Thus, for example, if an electronic device which supports both of Wi-Fi and LTE-U simultaneously communicate using respective communication protocols, a signal from a base station which complies with an LTE-U communication protocol may be detected or received as a noise through over the air (OTA) or the inside of an electronic device at a Wi-Fi module. In this case, an LTE-U communication signal has an influence on a signal to interference plus noise ratio (SINR) in the Wi-Fi module to result in deterioration in performance of the Wi-Fi module. If the Wi-Fi module and an LTE-U module use the same radio frequency (RF) module (e.g., an antenna), such deterioration in performance may be severe.

For example, referring to FIG. 2, an LTE-U module of an electronic device may be scheduled to receive data packets 221 and 222 according to an LTE-U protocol during an interval between $t_0$ and $t_1$ and an interval between $t_2$ and $t_3$. In this case, if a Wi-Fi module transmits the data packet 211 according to a Wi-Fi protocol during interval T started from time $T_0$ and receives an acknowledge (ACK) packet 212 corresponding to the data packet 211, the data packet 211 according to the Wi-Fi protocol and the data packet 221 according to the LTE-U protocol may interfere with each other during time T.

For example, the LTE-U module may receive the data packet 211 according to the Wi-Fi protocol unintentionally (i.e., as a noise) through OTA or the inside of the electronic device. For another example, an ACK packet 212 corresponding to the data packet 211 may be received over the same frequency channel as the data packet 221. Thus, the LTE-U module may fail to receive the data packet 221 as intended due to noise (e.g., the data packet 211) mixing, frequency (or channel) interference, or the like.

Aspects of the present disclosure are to address at least the above-mentioned problems and/or disadvantages and to provide at least the advantages described below. Accordingly, an aspect of the present disclosure is to provide a method for reducing an influence of in-device coexistence (IDC) if two or more communication protocols use a substantially common frequency band and for smoothly transmitting and receiving a data packet according to each communication protocol.

According to various embodiments disclosed in the present disclosure, a plurality of communication modules which use a common frequency band and comply with different communication protocols may fail to interfere with each other in transmitting and receiving each data packet. Thus, the plurality of communication modules may perform more efficient communication. In addition, a variety of effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
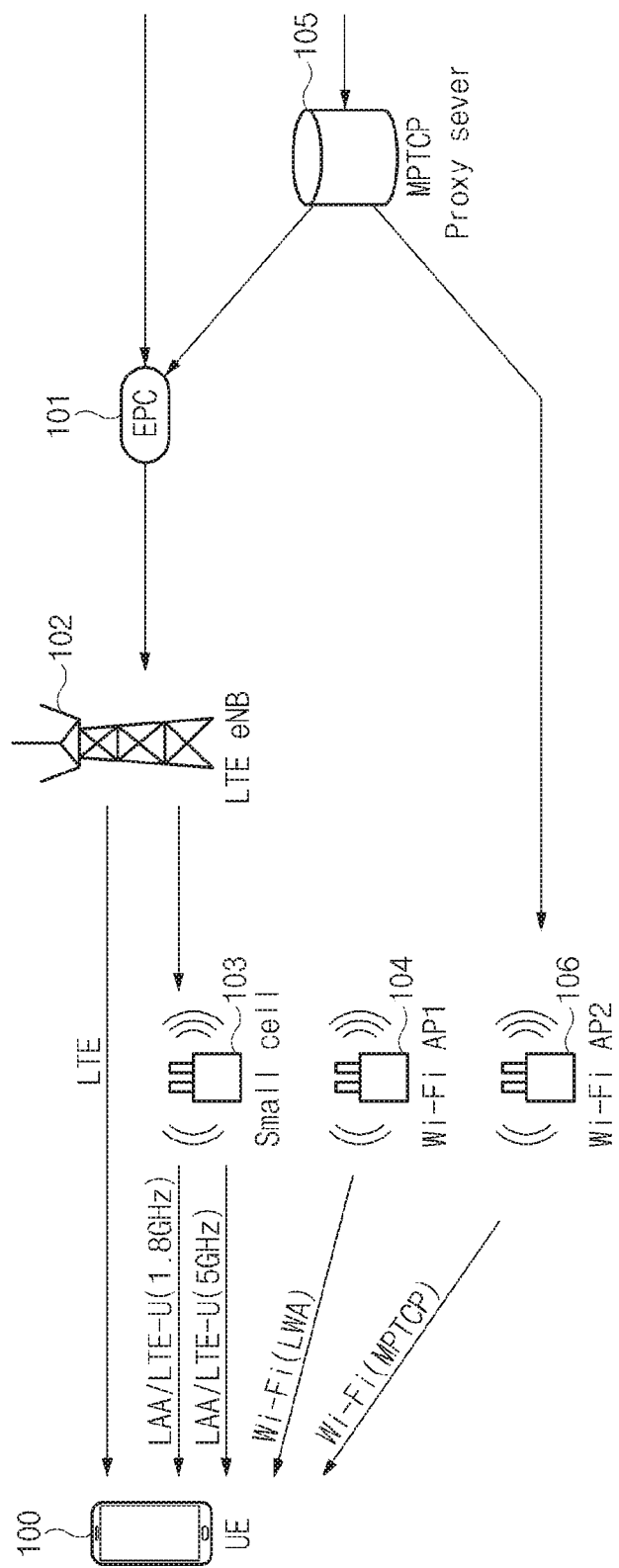
FIG. 1 illustrates a drawing of an operation environment of an electronic device according to various embodiments of the present disclosure.
Figure 2:
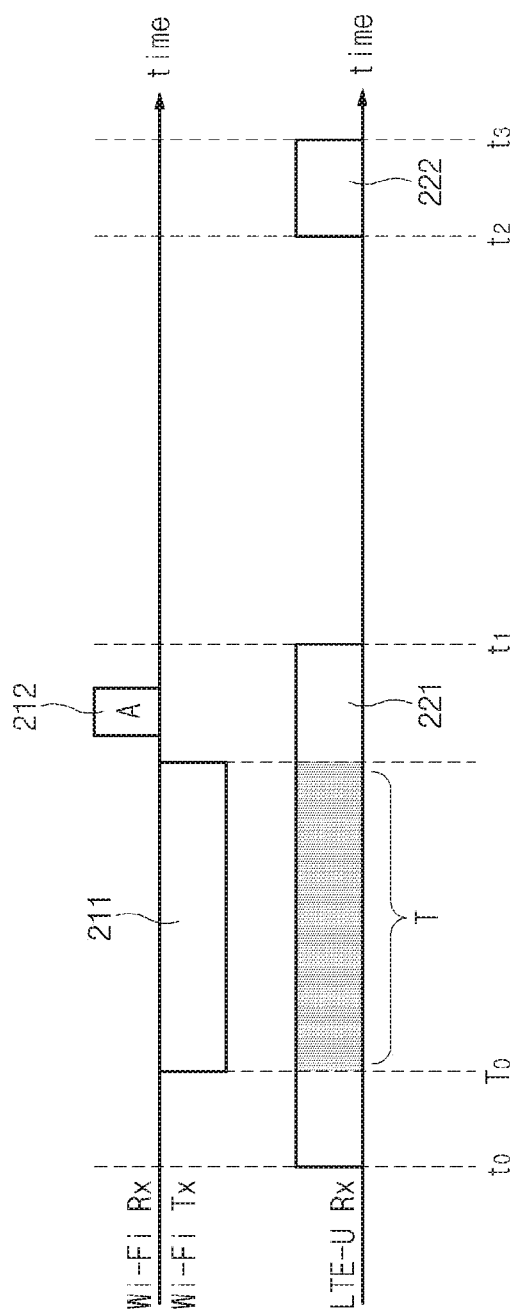
FIG. 2 illustrates an overlap of an interval where a data packet is transmitted and received from heterogeneous communication modules, according to various embodiments of the present disclosure.

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as being customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., SAMSUNG HOMESYNC™, APPLE TV™, or GOOGLE TV™), game consoles (e.g., XBOX™ or PLAYSTATION™), electronic dictionaries, electronic keys, camcorders, electronic picture frames, and the like.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a drawing of an operation environment of an electronic device according to various embodiments of the present disclosure.

Referring to FIG. 1, an electronic device 100 according to an embodiment may be implemented with various types of electronic devices. The electronic device 100 may be referred to as user equipment (UE), terminal equipment, a mobile station (MS), a mobile terminal (MT), a user terminal (UT), a subscribe station (SS), a wireless device, a handled device, or the like in various manners.

The electronic device 100 according to an embodiment may communicate with an external device (e.g., a base station (BS) 102, a small cell 103, a first wireless-fidelity (Wi-Fi) access point (AP) 104, or a second Wi-Fi AP 106) in a licensed band and an unlicensed band. The electronic device 100 may communicate using one or more protocols among, for example, long term evolution (LTE), licensed-assisted access using LTE (LAA), LTE-unlicensed (LTE-U), LTE-Wi-Fi aggregation (LWA), multipath transmission control protocol (MPTCP), or smart bonding. The electronic device 100 may support various communication protocols which simultaneously use a licensed band and an unlicensed band other than the above-mentioned communication protocols. The electronic device 100 may communicate according to the above-mentioned protocol by anchoring to an LTE channel which uses a licensed band and adding a channel which uses an unlicensed band.

The BS 102 may be a fixed station which communicates with the electronic device 100 and/or other devices (e.g., the small cell 103, the first Wi-Fi AP 104, and the second Wi-Fi AP 106). The BS 102 may be referred to as an advanced base station (ABS), a nodeB (NB), an evolved-nodeB (eNB), a base transceiver system (BTS), an AP, a processing server (PS), or the like in various manners.

According to an embodiment, the electronic device 100 may communicate with the BS 102 connected with an evolved packet core (EPC) 101 which is a core network. For example, if communicating using an LTE protocol, the electronic device 100 may communicate with the BS 102 in a licensed band.

According to an embodiment, the electronic device 100 may communicate with the small cell 103 connected with the BS 102. The electronic device 100 may communicate in an LAA or LTE-U scheme through the small cell 103. For example, the electronic device 100 may receive a signal of a licensed band (e.g., 1.8 GHz) and a signal of an unlicensed band (e.g., 5 GHz) from the small cell 103. Herein, each of the signals of the licensed band and the unlicensed band may be a signal according to an LTE standard. The electronic device 100 may communicate in the LAA or LTE-U scheme by anchoring to a primary cell (Pcell) of the licensed band and adding a secondary cell (Scell) of the unlicensed band.

According to an embodiment, the electronic device 100 may communicate with the first Wi-Fi AP 104. The electronic device 100 may communicate using a Wi-Fi protocol through the first Wi-Fi AP 104. In this case, the electronic device 100 may communicate in an LWA scheme through the BS 102 and the first Wi-Fi AP 104. For example, the electronic device 100 may aggregate a licensed band for LTE communication with the BS 102 and an unlicensed band for Wi-Fi communication with the first Wi-Fi AP 104. The first Wi-Fi AP 104 used in the LWA scheme may be connected with the BS 102.

According to an embodiment, the electronic device 100 may communicate in a smart bonding scheme through the BS 102 and the first Wi-Fi AP 104. For example, the electronic device 100 may aggregate the licensed band for the LTE communication with the BS 102 and the unlicensed band for the Wi-Fi communication with the first Wi-Fi AP 104 in an application level.

According to an embodiment, the electronic device 100 may communicate with the second Wi-Fi AP 106. The electronic device 100 may communicate using the Wi-Fi protocol through the second Wi-Fi AP 106. In this case, the electronic device 100 may communicate in an MPTCP scheme through the BS 102 and the second Wi-Fi AP 106. For example, the electronic device 100 may aggregate a licensed band used in LTE communication with the BS 102 with an unlicensed band used in Wi-Fi communication with the second Wi-Fi AP 106 in a TCP level. The second Wi-Fi AP 106 used in the MPTCP scheme may be connected with an MPTCP proxy server 105.

Figure 3:
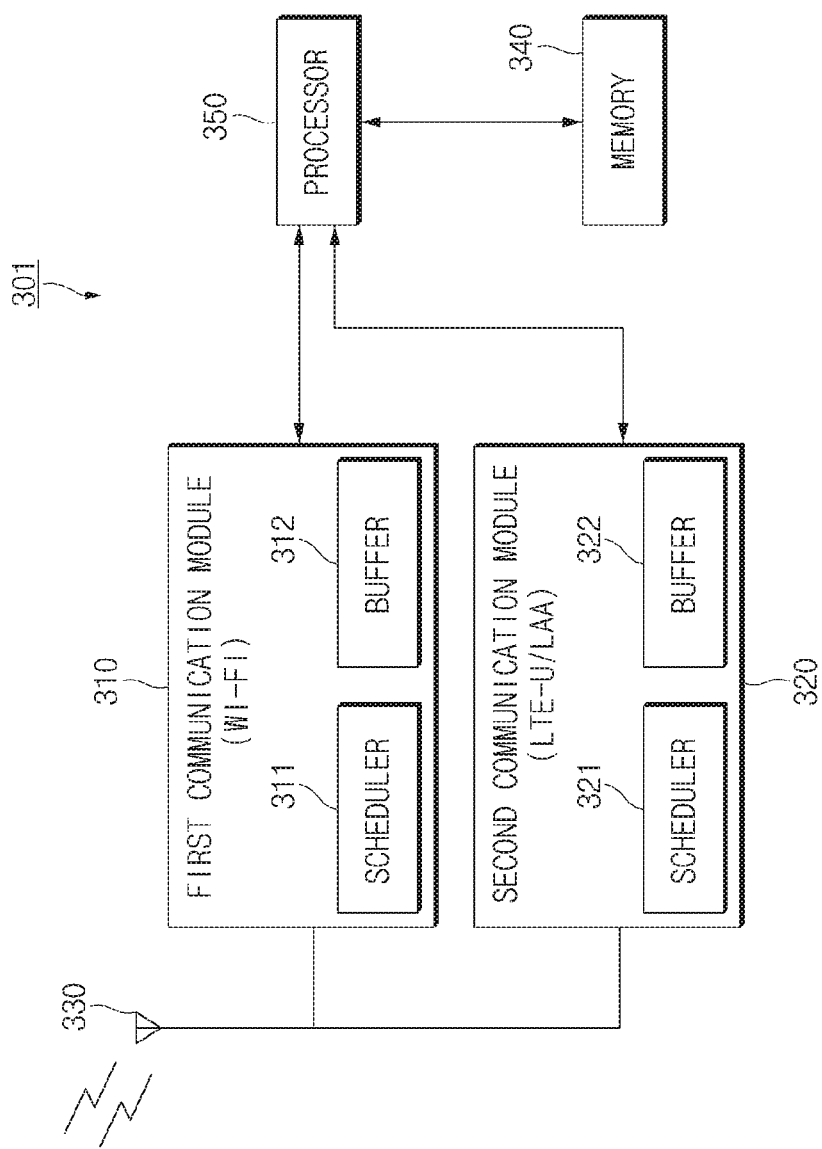
FIG. 3 illustrates a block diagram of a configuration of an electronic device, according to various embodiments of the present disclosure.

FIG. 3 illustrates a block diagram of a configuration of an electronic device according to various embodiments of the present disclosure.

Referring to FIG. 3, an electronic device 301 may include a first communication module 310, a second communication module 320, an antenna 330, a memory 340, and a processor 350. According to various embodiments, the electronic device 301 may be implemented not to include some of the elements or further include an element which is not shown.

The first communication module 310 may communicate with an external device, such as a BS or an AP, using a specified protocol through an antenna 330. For example, the first communication module 310 may correspond to a Wi-Fi module which uses a Wi-Fi communication protocol. According to an embodiment, the first communication module 310 may include, for example, a scheduler 311 for scheduling timing of transmitting or receiving a data packet with an external device and a buffer 312 for temporarily storing the transmitted or received data packet.

The second communication module 320 may communicate with an external device, such as a BS or a small cell, using a specified protocol through the antenna 330. For example, the second communication module 320 may include a communication module which uses an unlicensed band. For example, the second communication module 320 may include an LTE-U module or an LAA module. In FIG. 3, an embodiment is exemplified as LTE-U or LAA is a protocol of the second communication module 320. However, the protocol is not limited thereto. For example, the protocol of the second communication module 320 may include various wireless communication protocols defined in an unlicensed band. According to an embodiment, the second communication module 320 may include, for example, a scheduler 321 for scheduling timing of transmitting or receiving a data packet with an external device and a buffer 322 for temporarily storing the transmitted or received data packet.

According to an embodiment, the first communication module 310 and the second communication module 320 may be configured to use a common frequency band or substantially the same frequency band (e.g., 5 GHz band).

The antenna 330 may be implemented by attaching or fusing, for example, a metal pattern with injection-molded resin having a constant thickness and volume, by forming a pattern on a flexible printed circuit board (FPCB), or through a laser direct structuring (LDS) process. Signals having various frequency bands may resonate in the antenna 330. The first communication module 310 and/or the second communication module 320 may communicate with another device based on the resonating signals. As shown in FIG. 3, the antenna 330 may be shared by the first communication module 310 and the second communication module 320. According to various embodiments, the first communication module 310 and the second communication module 320 may be connected with separate antennas, respectively.

The memory 340 may store an instruction, information, or data associated with an operation of each of the elements 310 to 330 included in the electronic device 301. For example, the memory 340 may store instructions, when executed, causing the processor 350 to perform various operations described in the present disclosure. The instructions may be implemented with software, such as a program, an operating system (OS), or firmware, and may be stored in the memory 340. According to another embodiment, the instructions may be directly embedded in hardware (e.g., the processor 350).

The processor 350 may be electrically connected with the elements 310 to 340 included in the electronic device 301 and may execute an arithmetic operation or data processing about control and/or communication of the elements 310 to 340 included in the electronic device 301. The processor 350 may be implemented with, for example, dedicated hardware (e.g., a chip) or may be implemented to be included in at least one of an application processor (AP) or a communication processor (CP). The processor 350 which performs a communication method according to various embodiments of the present disclosure may be referred to as, for example, a "Tx/Rx timing adjusting module".

According to an embodiment, the processor 350 may verify a first data packet to be transmitted via the first communication module 310. For example, the processor 350 may verify the first data packet from a status of a buffer 312 included in the first communication module 310, that is, a situation where the buffer 312 stores data.

The processor 350 may verify the first data packet to be transmitted via the first communication module 310 and may obtain scheduling information of a second data packet which is or will be received via the second communication module 320. The processor 350 may adjust a time when transmission of the first data packet is started, based on the obtained scheduling information.

The scheduling information may include timing of receiving the second data packet. For example, the scheduling information may be included in a physical downlink control channel (PDCCH) in case of LTE-U and LAA. Further, the scheduling information may be included in a network allocation vector (NAV) set through request to send/clear to send (RTS/CTS) in case of Wi-Fi.

According to an embodiment, the processor 350 may adjust a time when transmission of the first data packet is started, such that an interval where the first data packet is transmitted is not overlapped with an interval where the second data packet is received, based on the scheduling information.

According to an embodiment, the processor 350 may adjust a time when transmission of the first data packet is started, in further consideration of a characteristic of the first data packet as well as the scheduling information in adjusting the time when the transmission of the first data packet is started.

For example, if the first data packet is a delay-sensitive data packet, the processor 350 may adjust the time when the transmission of the first data packet is transmitted, within a specified time range such that the transmission of the first data packet is not excessively delayed. The delay-sensitive data packet may include, for example, a voice packet (e.g., a voice over internet protocol (VoIP) data packet or a voice over LTE (VoLTE) data packet).

For another example, the first data packet may correspond to a large amount of data packet having a size of a specified value or more. In this case, the processor 350 may fragment the first data packet into two or more data packets to be transmitted via the first communication module 310 and may adjust a time when transmission of each of the two or more fragmented data packets is started based on the scheduling information. For example, the processor 350 may adjust a time when the transmission of each of the two or more fragmented data packets is started, such that an interval where each of the two or more fragmented data packets is transmitted is not overlapped with an interval where the second data packet is received.

According to various embodiments, the first communication module 310 may receive an acknowledge (ACK) packet in response to the transmission of the first data packet. If a new third data packet is verified to be transmitted via the second communication module 320, the processor 350 may obtain scheduling information of the third data packet. The processor 350 may adjust a time when transmission of the first data packet is started, such that an interval where an ACK packet which responds to the first data packet is received is not overlapped with an interval where the third data packet is transmitted, based on the scheduling information of the third data packet.

For example, the scheduling information of the third data packet to be transmitted via the second communication module 320 may be obtained through uplink (UL) grant information in case of LAA and may be obtained through a transmit opportunity (Tx OP) period of time or "Tx burst" in transmission itself and enhanced distributed channel access (EDCA) in case of Wi-Fi.

Meanwhile, an interval where the first data packet is transmitted via the first communication module 310 may be inevitably overlapped with an interval where the second data packet is received via the second communication module 320. In this case, the processor 350 may adjust a time when transmission of the first data packet is started to a proper time based on transmission properties of the first data packet and/or the second data packet (see FIG. 6, 7A, 7B, or the like). The transmission properties may include, for example, at least one of an amount of transmission of a data packet, communication quality of the data packet, or a transmission speed of the data packet.

The described operation of the processor 350 is an example and is not limited to the above description. For example, an operation of the electronic device, described in another portion of the present disclosure, may be understood as the operation of the processor 350. Further, in the present disclosure, at least some of operations described as the operation of the "electronic device" may be understood as an operation of a processor included in the electronic device. Further, operations of the first communication module 310 and the second communication module 320 may be exchanged and performed with each other irrespective of a used protocol.

Hereinafter, a description will be given of a communication method according to various embodiments of the present disclosure with reference to a flowchart illustrating an operation of the electronic device and a timing diagram of signals transmitted and received by the first communication module 310 and the second communication module 320.

Figure 4:
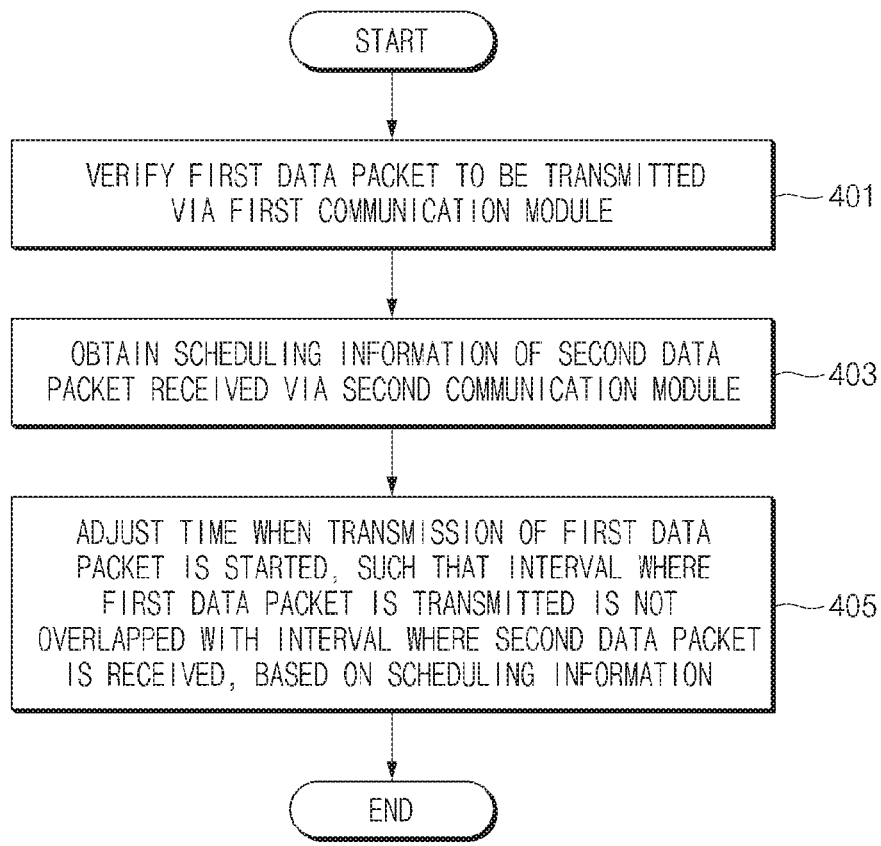
FIG. 4 illustrates a flowchart of a communication method according to various embodiments of the present disclosure.

FIG. 4 illustrates a flowchart of a communication method according to various embodiments of the present disclosure.

Referring to FIG. 4, the communication method according to an embodiment may include operations 401 to 405. Operations 401 to 405 may be performed by, for example, an electronic device 301 shown in FIG. 3. Each of operations 401 to 405 may be implemented with, for example, instructions performable (executable) by a processor 350 of the electronic device 301. Hereinafter, a description will be given of operations 401 to 405 using reference numerals of FIG. 3.

In operation 401, the processor 350 of the electronic device 301 may verify a first data packet to be transmitted via a first communication module 310. For example, the processor 350 may verify the first data packet from a status of a buffer 312 included in the first communication module 310. In this case, the processor 350 may verify a size, a characteristic, or the like of the first data packet.

In operation 403, the processor 350 may obtain scheduling information of a second data packet received via a second communication module 320 which uses a frequency band which is common (or is substantially the same) to (or as) the first communication module 310. The scheduling information may include timing of receiving the second data packet. For example, the scheduling information may be included in a PDCCH in case of LTE-U and LAA and may be included in an NAV to be set through RTS/CTS in case of Wi-Fi.

In operation 405, the processor 350 may adjust a time when transmission of the first data packet is started, such that an interval where the first data packet is transmitted is not overlapped with an interval where the second data packet is received, based on the scheduling information obtained in operation 403.

According to an embodiment, the processor 350 may adjust the time when the transmission of the first data packet is started, in further consideration of a characteristic of the first data packet as well as the scheduling information in adjusting the time when the transmission of the first data packet is started.

For example, if the first data packet is a delay-sensitive data packet, the processor 350 may adjust the time when the transmission of the first data packet is transmitted, with a specified time range such that the transmission of the first data packet is not excessively delayed. The delay-sensitive data packet may include, for example, a voice packet (e.g., a VoIP data packet or a VoLTE data packet).

Figure 5:
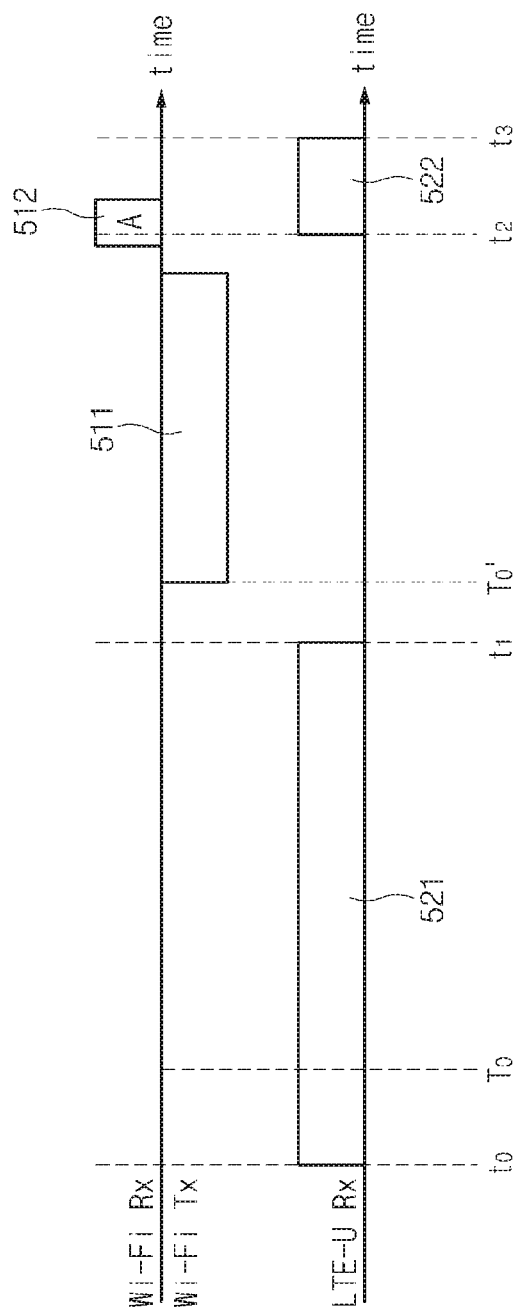
FIG. 5 illustrates adjusting a time when transmission of a data packet is started, according to various embodiments of the present disclosure.

FIG. 5 illustrates adjusting a time when transmission of a data packet is started, according to various embodiments of the present disclosure.

Referring to FIG. 5, an electronic device according to an electronic device may receive a data packet 521 during an interval between $t_0$ and $t_1$ and may receive a data packet 522 during an interval between $t_2$ and $t_3$, via an LTE-U module (an example of a second communication module) which uses an LTE-U protocol.

According to an embodiment, a Wi-Fi module (an example of a first communication module) may receive, for example, a data packet 511 to be transmitted from an AP to an external device at time $T_0$. The data packet 511 may be temporarily stored in a buffer included in the Wi-Fi module. A processor (e.g., a Tx/Rx timing adjusting module) of the electronic device may verify the data packet 511 to be transmitted, from a status of the buffer included in the Wi-Fi module.

According to an embodiment, if the data packet 511 at time $T_0$ is verified, the processor may obtain scheduling information of the data packets 521 and 522 which are received or will be received via the LTE-U module. According to another embodiment, after obtaining the scheduling information of the data packets 521 and 522 which are received or will be received via the LTE-U module in advance, the processor may verify the data packet 511. The processor may adjust a time when transmission of the data packet 511 is started, based on the scheduling information.

For example, after the data packet 511 provided at time $T_0$ is verified, the processor may delay a time when transmission of the data packet 511 is started to time $T_0'$, such that an interval where the data packet 511 is transmitted is not overlapped with an interval where the data packets 521 and 522 are received, based on the scheduling information of the data packets 521 and 522. Thus, the transmission of the data packet 511 and the reception of the data packets 521 and 522 may fail to be performed at the same time.

An ACK packet which responds to the transmission of the data packet 511 may be received concurrently with, for example, the data packet 522 over a different channel in the same frequency band where the data packet 522 is received. According to some embodiments, the ACK packet 512 may be received over the same channel of the same frequency band as the data packet 522. In this case, the processor may adjust a time when transmission of the data packet 511 is started, such that the ACK packet 512 corresponding to the data packet 511 is not overlapped with the data packet 522.

Figure 6:
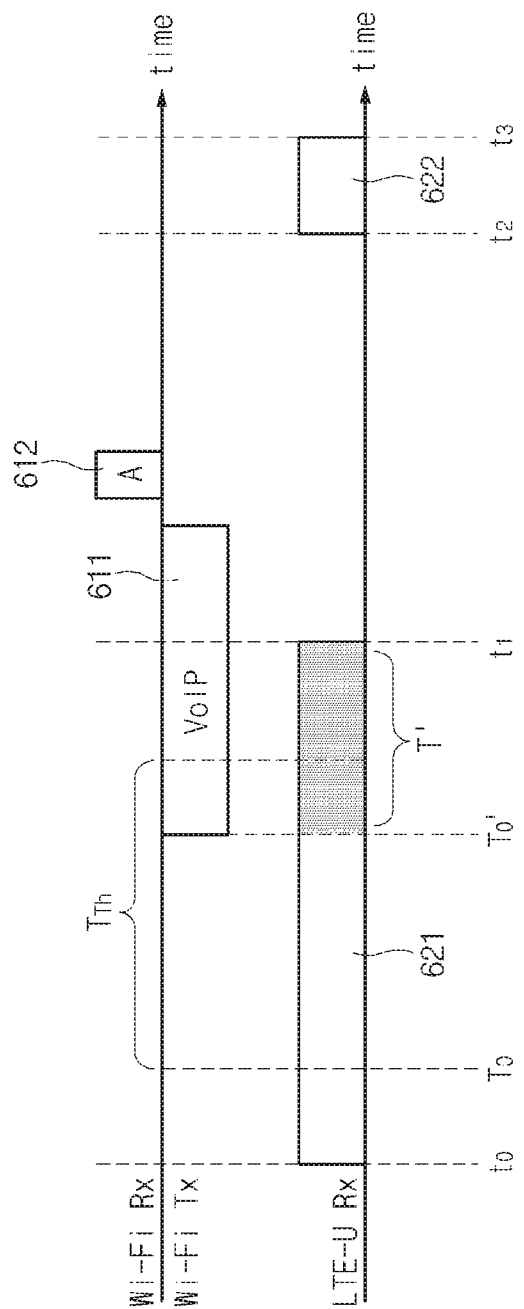
FIG. 6 illustrates adjusting a time when transmission of a voice packet is started, according to various embodiments of the present disclosure.

FIG. 6 illustrates adjusting a time when transmission of a voice packet is started, according to various embodiments of the present disclosure.

Referring to FIG. 6, an electronic device according to an embodiment may receive a data packet 621 during an interval between $t_0$ and $t_1$ and may receive a data packet 622 during an interval between $t_2$ and $t_3$, via an LTE-U module (an example of a second communication module) which uses an LTE-U protocol.

According to an embodiment, a Wi-Fi module (an example of a first communication module) may receive, for example, a voice packet (e.g., a VoIP data packet) to be transmitted from an AP to an external device at time $T_0$. The voice packet 611 may be temporarily stored in a buffer included in the Wi-Fi module. A processor (e.g., a Tx/Rx timing adjusting module) of the electronic device may verify presence, a characteristic, and the like of the voice packet 611 to be transmitted, from a status of the buffer included in the Wi-Fi module.

According to an embodiment, if the voice packet 611 at time $T_0$ is verified, the processor may obtain scheduling information of the data packets 621 and 622 which are received or will be received via the LTE-U module. According to another embodiment, after obtaining the scheduling information of the data packets 621 and 622, which are received or will be received via the LTE-U module, in advance, the processor may verify the voice packet 611. The processor may adjust a time when transmission of the voice packet 611 is started, based on the obtained scheduling information. In this case, since the voice packet 611 to be transmitted from the Wi-Fi module is a delay-sensitive voice packet, the processor may adjust a time when transmission of the voice packet 611 is started, within a specified time range $T_{Th}$, such that transmission of the voice packet 611 is not excessively delayed.

For example, after the voice packet 611 provided at time $T_0$ is verified, the processor may delay a time when transmission of the voice packet 611 is started to time $T_0'$ based on scheduling information of the data packets 621 and 622. In this case, an interval where the voice packet 611 is transmitted may be overlapped with an interval where the data packet 621 is received in a partial interval T'.

As shown in FIG. 5, it may be preferable to more delay time T0' when transmission of the voice packet 611 is started to reduce interference between the LTE-U module and the Wi-Fi module (i.e., reduce the interval T'). Herein, since the voice packet 611 is a delay-sensitive voice packet, it may be preferable to more advance a time when transmission of the voice packet 611 is started to prevent deterioration in quality of call service according to a transmission delay. Thus, the processor should select a time in consideration of both of an influence of interference between the LTE-U module and the Wi-Fi module and deterioration in quality of call service in determining a time when transmission of the voice packet 611 is started. Thus, an overlap in the interval T' may be inevitable. In this case, the electronic device may compare an effect where an overlapped interval is reduced by delaying the time when the transmission of the voice packet 611 is started by the interval T' with deterioration in performance, which is generated by delaying the time when the transmission of the voice packet 611 is started and may determine the time when the transmission of the voice packet 611 is started.

In general, in communication of the electronic device, the transmit (Tx) and receive (Rx) of a data packet may fail to be simultaneously performed. Thus, the electronic device may transmit the voice packet 611 prior to reception of the data packet 621 in the interval T'. Meanwhile, an ACK packet 612 may be received via the Wi-Fi module in response to transmission of the voice packet 611.

Figure 7A:
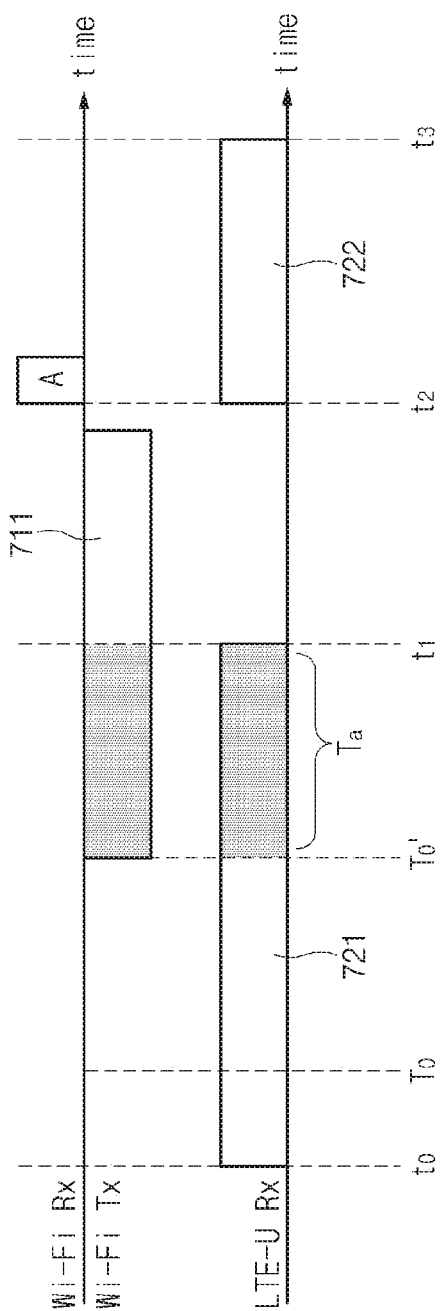
FIGS. 7A and 7B illustrate adjusting a time when transmission of a large amount of data packet is started, according to various embodiments of the present disclosure.
Figure 7B:
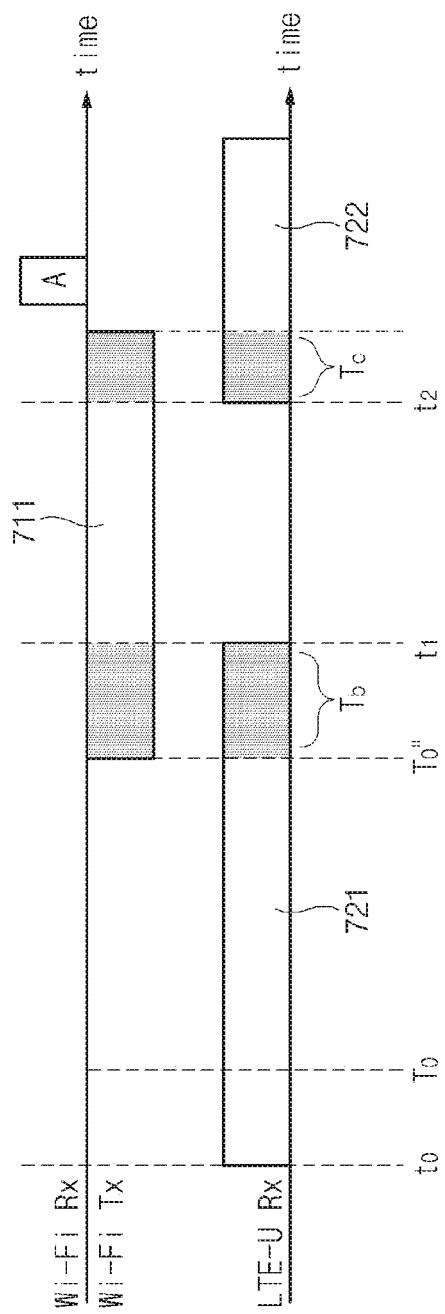

FIGS. 7A and 7B illustrate adjusting a time when transmission of a large amount of data packet is started, according to various embodiments of the present disclosure.

Referring to FIG. 7A, an electronic device according to an electronic device may receive a data packet 721 during an interval between $t_0$ and $t_1$ and may receive a data packet 722 during an interval between $t_2$ and $t_3$, via an LTE-U module (an example of a second communication module) which uses an LTE-U protocol.

According to an embodiment, a Wi-Fi module (an example of a first communication module) may receive, for example, a large amount of data packet 711 (e.g., a packet having a size of a specified value or more) to be transmitted from an AP to an external device at time $T_0$. The data packet 711 may be temporarily stored in a buffer included in the Wi-Fi module. A processor (e.g., a Tx/Rx timing adjusting module) of the electronic device may verify presence, a size, a characteristic, and the like of the data packet 711 to be transmitted, from a status of the buffer included in the Wi-Fi module.

According to an embodiment, if the data packet 711 at time $T_0$ is verified, the processor may obtain scheduling information of the data packets 721 and 722 which are received or will be received via the LTE-U module. According to another embodiment, after obtaining the scheduling information of the data packets 721 and 722, which are received or will be received via the LTE-U module, in advance, the processor may verify the data packet 711.

The processor may adjust a time when transmission of the data packet 711 is started, based on the obtained scheduling information. In this case, since the data packet 711 is a packet having a size of a specified value or more, the data packet 711 may fail to be transmitted during an interval between $t_1$ and $t_2$, which is an interval between an interval where the data packet 721 is received and an interval where the data packet 722 is received. Thus, an interval where the data packet 711 is transmitted may be overlapped with, for example, the interval where the data packet 721 is received (see interval $T_a$).

Referring to FIG. 7B, according to an embodiment, after the data packet 711 provided at time $T_0$ is verified, the processor of the electronic device may delay a time when transmission of the data packet 711 is started to time $T_0''$ (which is later than time $T_0'$ of FIG. 7A), based on scheduling information of the data packets 721 and 722. According to various embodiments, the processor may determine the time when the transmission of the data packet 711 is started as time $T_0''$ based on the previously obtained scheduling information of the data packets 721 and 722. Thus, in FIG. 7B, an interval where the data packet 711 is transmitted may be overlapped with an interval where the data packets 721 and 722 are received in a plurality of intervals $T_b$ and $T_c$.

According to an embodiment, the processor may determine the time $T_0''$ when the transmission of the data packet 711 is started, such that the sum of intervals $T_b$ and $T_c$ is less than interval $T_a$, that is, such that an overlapped interval is reduced.

Further, according to an embodiment, the processor may determine the time $T_0''$ when the transmission of the data packet 711 is started, in consideration of importance (e.g., priority) of a data packet received in intervals $T_b$ and $T_c$, an amount of transmission of data in each interval, a transmission speed in each interval, or the like. The processor may increase interval $T_b$ (decrease interval $T_c$) or may decrease interval $T_b$ (increase interval $T_c$) by adjusting time $T_0''$.

For example, the data packet 721 received via the LTE-U module may be a video streaming packet which should be minimized in retransmission or may be a delay-sensitive voice packet. In this case, the time when the transmission of the data packet 711, transmitted via the Wi-Fi module, is started may be adjusted to minimize an overlap with an interval where the data packet 721 is received (i.e., minimize interval $T_b$).

For another example, a predicted reception speed of the data packet 721 received via the LTE-U module may be 30 Mbps, and a predicted reception speed of the data packet 722 may be 75 Mbps. In this case, the time when the transmission of the data packet 711, transmitted via the Wi-Fi module, is started may be adjusted to minimize an overlap with an interval where the data packet 722 is received (i.e., minimize interval $T_c$).

In FIG. 7B, as shown in intervals $T_b$ and $T_c$, an interval where the data packet 711 is transmitted is overlapped with the other data packets 721 and 722. However, the interval where the data packet 711 is transmitted and/or the time when transmission of the data packet 711 is started are not limited thereto. According to various embodiments, the electronic device may further delay the time when the transmission of the data packet 711 is started after, for example, a time when reception of the data packet 722 is completed, in consideration of a characteristic of the data packet 711, an amount of transmission of the data packet 711, a transmission speed of the data packet 711, and the like. In this case, the electronic device may determine a time when the transmission of the data packet 711 is started, in consideration of importance, an amount of transmission, or a transmission speed of the data packet 711 transmitted via the Wi-Fi module, the data packet 722 received via the LTE-U module, or a data packet subsequent to the data packet 722. For example, the electronic device may determine whether an interval between the data packet 722 and the data packet subsequent to the data packet 722 is greater than an interval between $t_1$ and $t_2$ and may determine the time when the transmission of the data packet 711 is started by comparing an effect in which an overlapped interval is reduced by delaying the time when the transmission of the data packet 711 is started with deterioration in performance, which is generated by delaying the time when the transmission of the data packet 711 is started.

Figure 8:
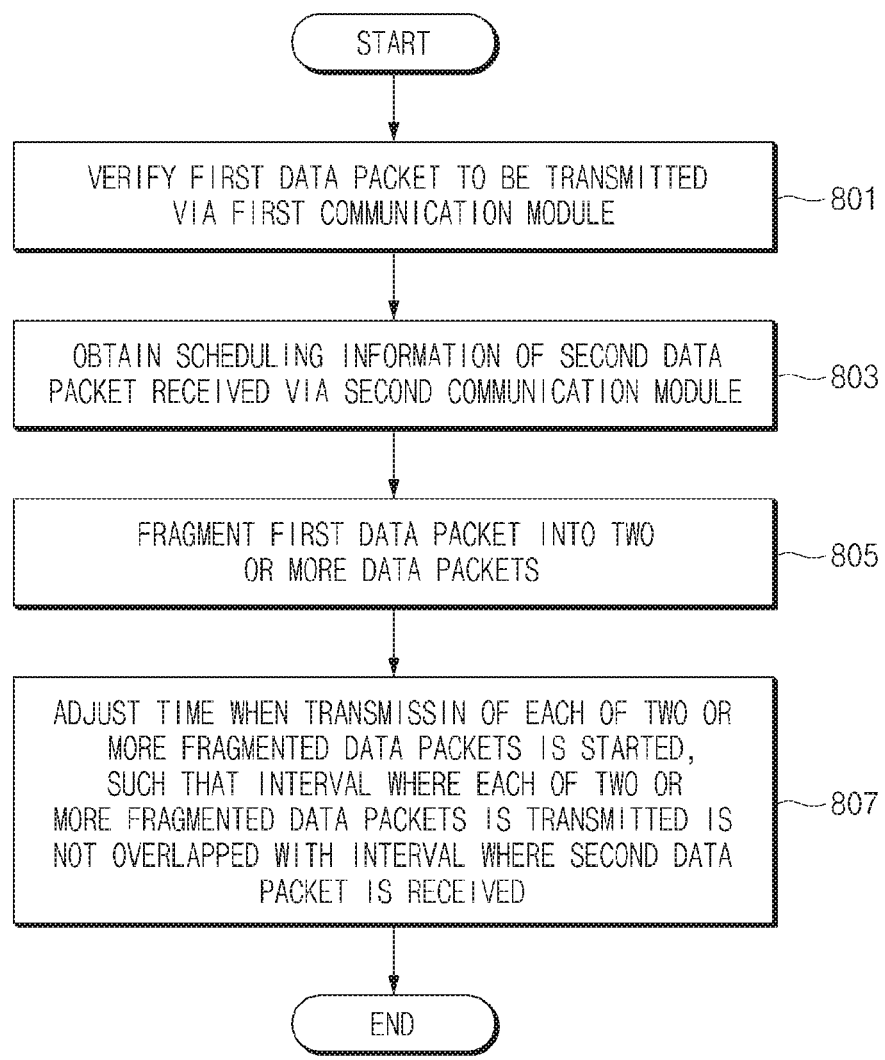
FIG. 8 illustrates a flowchart of a communication method according to various embodiments of the present disclosure.

FIG. 8 illustrates a flowchart of a communication method according to various embodiments of the present disclosure.

Referring to FIG. 8, the communication method according to another embodiment may include operations 801 to 807. Operations 801 to 807 may be performed by, for example, an electronic device 301 shown in FIG. 3. Each of operations 801 to 807 may be implemented with, for example, instructions performable (executable) by a processor 350 of the electronic device 301. Hereinafter, a description will be given of operations 801 to 807 using reference numerals of FIG. 3 and a description duplicated by a description of FIG. 4 will be omitted.

In operation 801, the processor 350 of the electronic device 301 may verify a first data packet to be transmitted via a first communication module 310. For example, the processor 350 may verify that the first data packet has a size of a specified value or more from a status of a buffer 312 included in the first communication module 310.

In operation 803, the processor 350 may obtain scheduling information of a second data packet received via a second communication module 320 which uses a frequency band which is common (or is substantially the same) to (or as) the first communication module 310.

In operation 805, the processor 350 may fragment the first data packet into two or more data packets.

In operation 807, the processor 350 may adjust a time when transmission of each of the two or more fragmented data packets is started, such that an interval where each of the two or more data packets fragmented in operation 805 is transmitted is not overlapped with an interval where the second data packet is received.

Figure 9A:
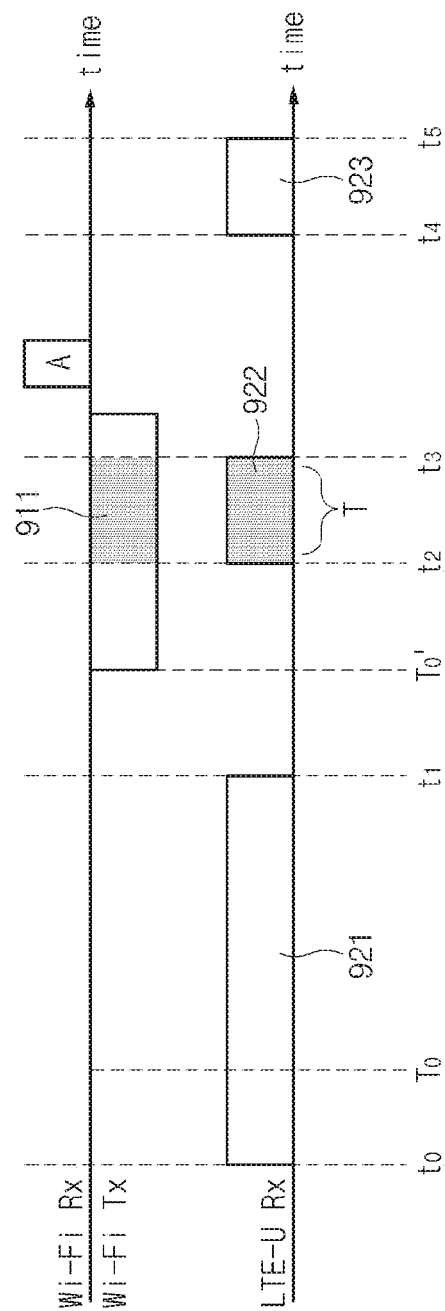
FIGS. 9A and 9B illustrate adjusting a time when transmission of a fragmentation packet is started, according to various embodiments of the present disclosure.
Figure 9B:
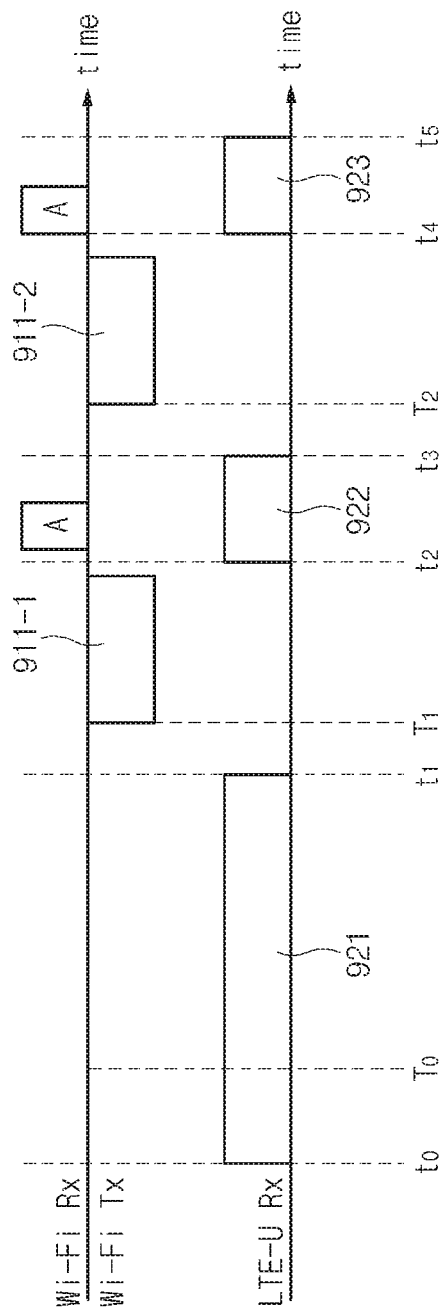

FIGS. 9A and 9B illustrate adjusting a time when transmission of a fragmentation packet is started, according to various embodiments of the present disclosure.

Referring to FIG. 9A, an electronic device according to an electronic device may receive a data packet 921 during an interval between $t_0$ and $t_1$, may receive a data packet 922 during an interval between $t_2$ and $t_3$, and may receive a data packet 923 during an interval between $t_4$ and $t_5$, via an LTE-U module (an example of a second communication module) which uses an LTE-U protocol.

According to an embodiment, a Wi-Fi module (an example of a first communication module) may receive, for example, a data packet 911 (e.g., a large amount of packet having a size of a specified value or more) to be transmitted from an AP to an external device at time $T_0$. The data packet 911 may be temporarily stored in a buffer included in the Wi-Fi module. A processor (e.g., a Tx/Rx timing adjusting module) of the electronic device may verify presence, a size, a characteristic, and the like of the data packet 911 to be transmitted, from a status of the buffer included in the Wi-Fi module.

According to an embodiment, if the data packet 911 at time $T_0$ is verified, the processor may obtain scheduling information of the data packets 921 to 923 which are received or will be received via the LTE-U module. According to another embodiment, after obtaining the scheduling information of the data packets 921 to 923, which are received or will be received via the LTE-U module, in advance, the processor may verify the data packet 911.

The processor may adjust time $T_0'$ when transmission of the data packet 911 is started, based on the obtained scheduling information. When considering a size, a transmission speed, or the like of the data packet 911, an interval between $t_1$ and $t_2$ may fail to be sufficient to transmit the data packet 911. Further, to prevent an overlap with the data packet 921 received via the LTE-U module, although the data packet 911 is transmitted from time $T_0'$, an interval where the data packet 911 is transmitted may be overlapped with, for example, an interval where the data packet 922 is received (see interval T).

As described with reference to FIG. 9A, after verifying the data packet 911 provided at time $T_0$, the processor of the electronic device may verify that the interval between $t_1$ and $t_2$ is not sufficient to successfully transmit the data packet 911, based on the scheduling information and the like of the data packets 921 to 923.

Thus, referring to FIG. 9B, the processor according to an embodiment may fragment the data packet 911 into a first fragmentation packet 911-1 and a second fragmentation packet 911-2. The processor may adjust each of sizes of the first fragmentation packet 911-1 and the second fragmentation packet 911-2 not to be overlapped with an interval where each of the data packets 921 to 923 is received in fragmenting the data packet 911.

The processor may adjust time $T_1$ when the first fragmentation packet 911-1 is transmitted and time $T_2$ when the second fragmentation packet 911-2 is transmitted, such that an interval where the first fragmentation packet 911-1 is transmitted and an interval where the second fragmentation packet 911-2 is transmitted are not overlapped with an interval where each of the data packets 921 to 923 is received, based on the scheduling information of the data packets 921 to 923. Thus, the transmission of the first and second fragmentation packets 911-1 and 911-2 from the Wi-Fi module may fail to be performed concurrently with the reception of the data packets 921 to 923 through the LTE-U module.

Figure 10:
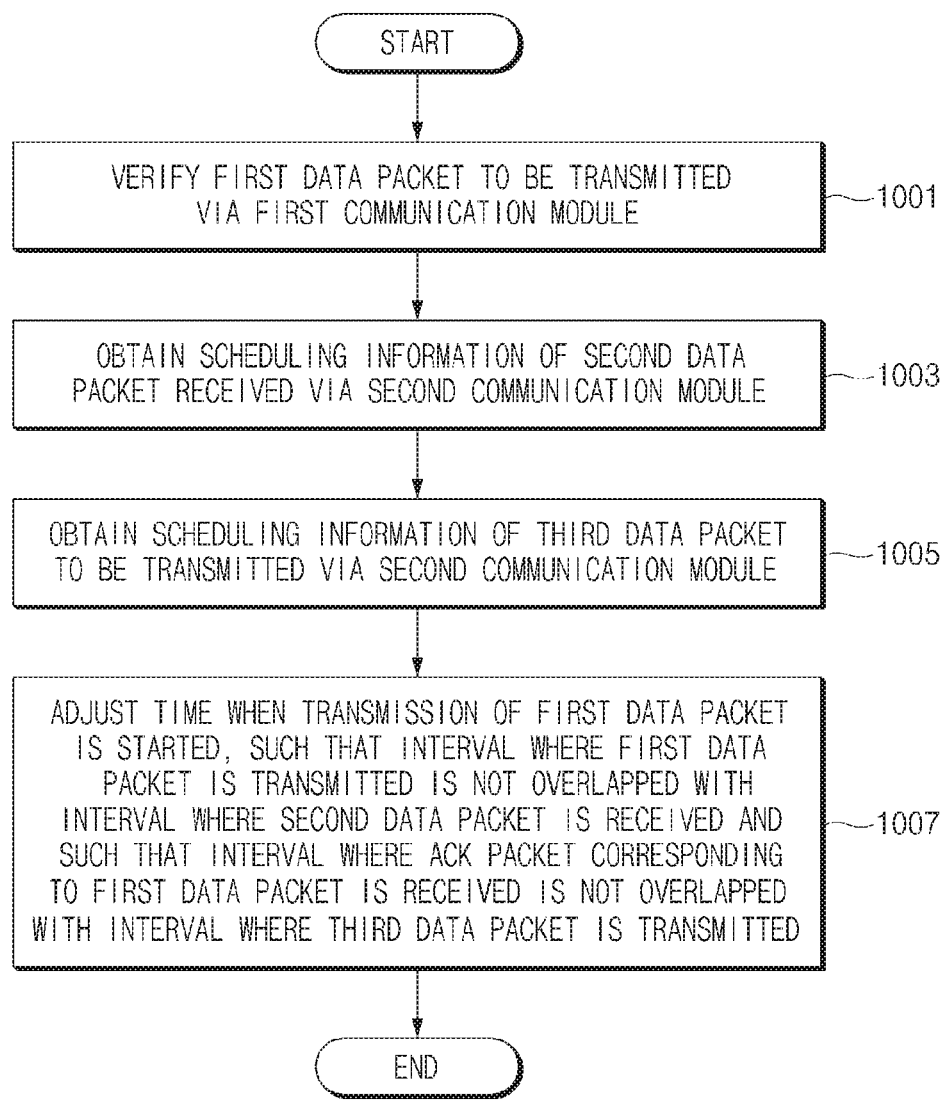
FIG. 10 illustrates a flowchart of a communication method according to various embodiments of the present disclosure.

FIG. 10 illustrates a flowchart of a communication method according to various embodiments of the present disclosure.

Referring to FIG. 10, the communication method according to another embodiment may include operations 1001 to 1007. Operations 1001 to 1007 may be performed by, for example, an electronic device 301 shown in FIG. 3. Each of operations 1001 to 1007 may be implemented with, for example, instructions performable (executable) by a processor 350 of the electronic device 301. Hereinafter, a description will be given of operations 1001 to 1007 using reference numerals of FIG. 3 and a description duplicated by a description of FIG. 4 will be omitted.

In operation 1001, the processor 350 of the electronic device 301 may verify a first data packet to be transmitted via a first communication module 310. For example, the processor 350 may verify the first data packet from a status of a buffer 312 included in the first communication module 310.

In operation 803, the processor 350 may obtain reception scheduling information of a second data packet received via a second communication module 320 which uses a frequency band which is common (or is substantially the same) to (or as) the first communication module 310.

In operation 1005, the processor 350 may verify a third data packet to be transmitted via the second communication module 320 and may obtain scheduling information of the third data packet.

In operation 1007, the processor 350 may adjust a time when transmission of the first data packet is started, based on the scheduling information of the second data packet, obtained in operation 1003, and the scheduling information of the third data packet, obtained in operation 1005. According to an embodiment, the processor 350 may adjust the time when the transmission of the first data packet is started, such that an interval where the first data packet is transmitted is not overlapped with an interval where the second data packet is received and such that an interval where an ACK packet corresponding to the first data packet is received is not overlapped with an interval where the third data packet is transmitted, based on the scheduling information.

Figure 11A:
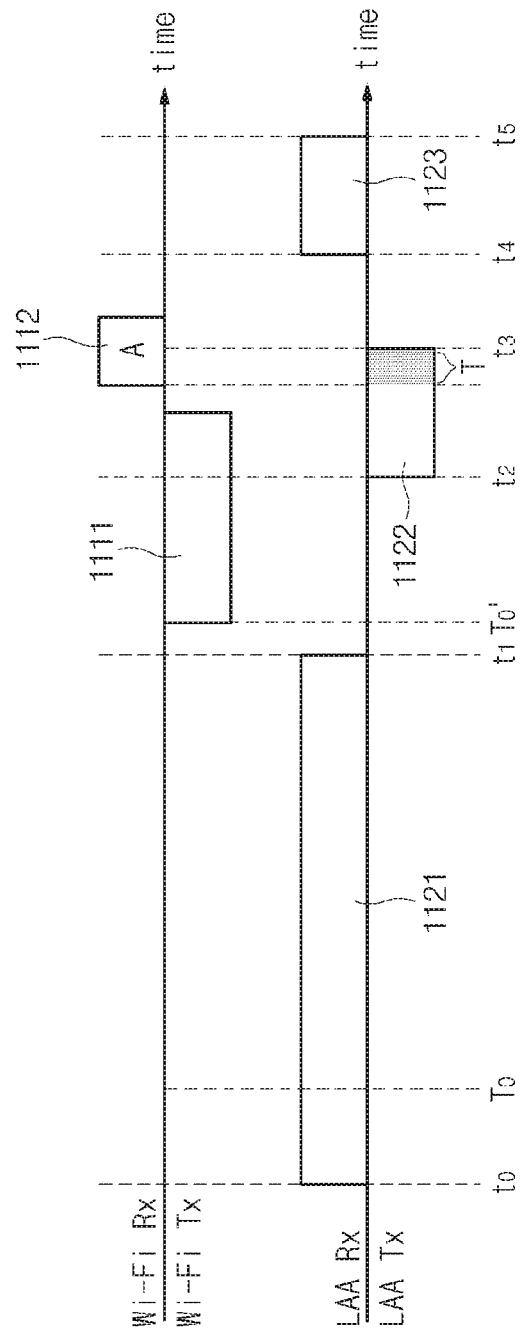
FIGS. 11A and 11B illustrate adjusting a time when transmission of a data packet is started, in consideration of an acknowledge (ACK) packet according to various embodiments of the present disclosure.
Figure 11B:
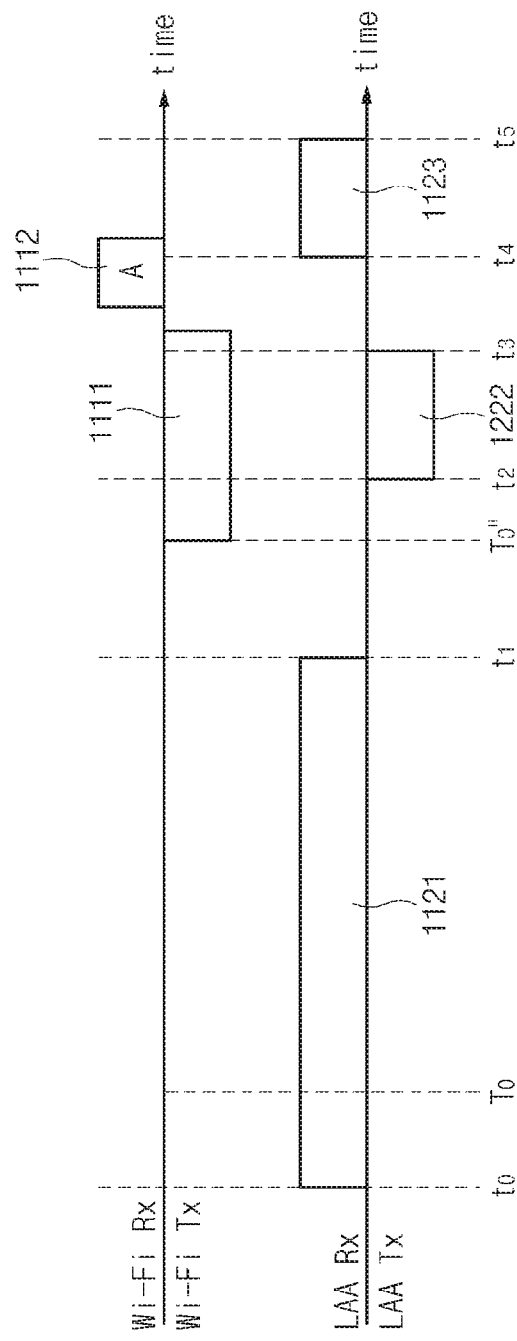

FIGS. 11A and 11B illustrate adjusting a time when transmission of a data packet is started, in consideration of an ACK packet according to various embodiments of the present disclosure.

Referring to FIG. 11A, an electronic device according to an electronic device may receive a data packet 1121 during an interval between $t_0$ and $t_1$, may transmit a data packet 1122 during an interval between $t_2$ and $t_3$, and may receive a data packet 1123 during an interval between $t_4$ and $t_5$, via an LAA module (an example of a second communication module) which uses an LAA protocol.

According to an embodiment, a Wi-Fi module (an example of a first communication module) may receive, for example, a data packet 1111 to be transmitted from an AP to an external device at time $T_0$. The data packet 1111 may be temporarily stored in a buffer included in the Wi-Fi module. A processor (e.g., a Tx/Rx timing adjusting module) of the electronic device may verify presence, a size, a characteristic, and the like of the data packet 1111 to be transmitted from the buffer included in the Wi-Fi module.

According to an embodiment, if the data packet 1111 at time $T_0$ is verified, the processor may obtain transmission/reception scheduling information of the data packets 1121 to 1123 which are received or will be received via the LAA module. According to another embodiment, after obtaining the scheduling information of the data packets 1121 to 1123, which are received or will be received via the LAA module, in advance, the processor may verify the data packet 1111. The processor may adjust time $T_0'$ when transmission of the data packet 1111 is started, based on the obtained scheduling information.

After the data packet 1111 is transmitted from time $T_0'$, an ACK packet 1112 (e.g., a medium access control (MAC) ACK packet) may be received in response to the transmission of the data packet 1111. An interval where the ACK packet 1112 is received may be partially overlapped with, for example, an interval where the data packet 1122, transmitted via the LAA module, is transmitted (see interval T).

Referring to FIG. 11B, according to an embodiment, after verifying the data packet 1111 provided at time $T_0$, the processor of the electronic device may adjust a time when transmission of the data packet 1111 is started, such that the ACK packet corresponding to the data packet 1111 is not overlapped with the data packets 1121 to 1123, based on the scheduling information of the data packets 1121 to 1123. As an example, the processor may delay the time when the transmission of the data packet 1111 is started to time $T_0''$ (which is later than time $T_0'$ of FIG. 11A).

For example, time $T_0''$ when the transmission of the data packet 1111 is started may be determined such that an interval where the data packet 1111 is transmitted is not overlapped with an interval where the data packet 1121 is received and such that an interval where the ACK packet 1112 corresponding to the data packet 1111 is received is not overlapped with an interval where the data packet 1122 is transmitted. As the time when the transmission of the data packet 1111 is started is determined as time $T_0''$, the transmission of the data packet 1111 may fail to be accomplished concurrently with the reception of the data packet 1121 and the reception of the ACK packet 1112 may fail to be accomplished concurrently with the transmission of the data packet 1122.

Meanwhile, if a frequency channel over which the ACK packet 1112 is received is different from a frequency channel over which the data packet 1123 is received, the reception of the ACK packet 1112 is accomplished concurrently with the reception of the data packet 1123. Herein, if the ACK packet 1112 and the data packet 1123 are received over the same frequency band and the same channel, time $T_0''$ when the transmission of the data packet 1111 is started may be adjusted such that the ACK packet 1112 and the data packet 1123 are not simultaneously received.

Figure 12A:
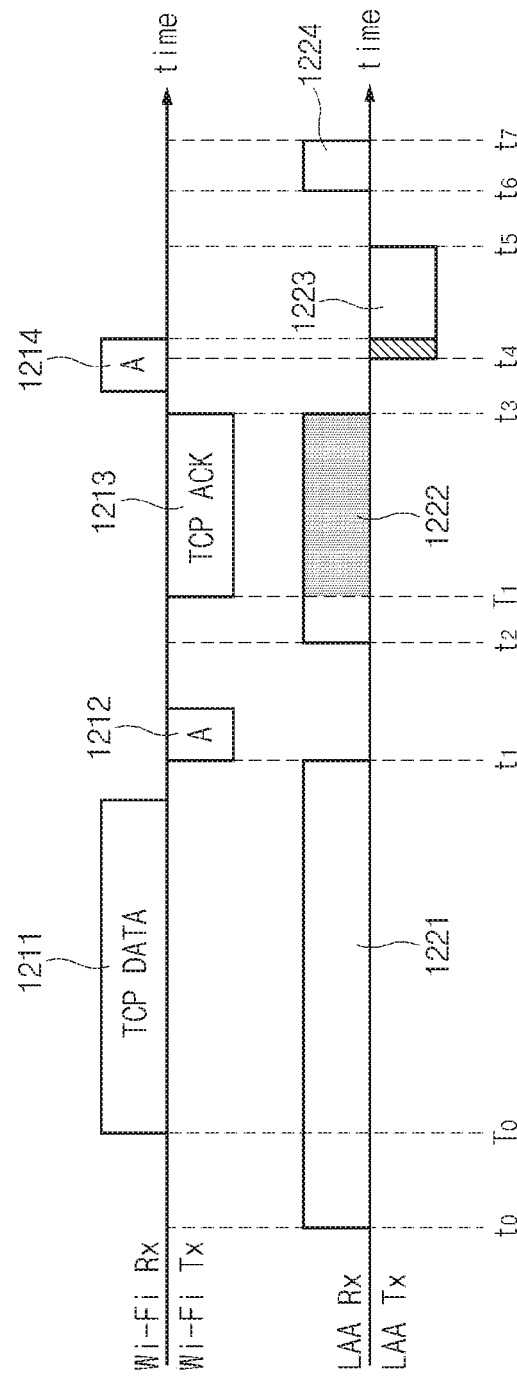
FIGS. 12A and 12B illustrate adjusting a time when transmission of a data packet is started, in consideration of a transmission control protocol (TCP) ACK packet according to various embodiments of the present disclosure.
Figure 12B:
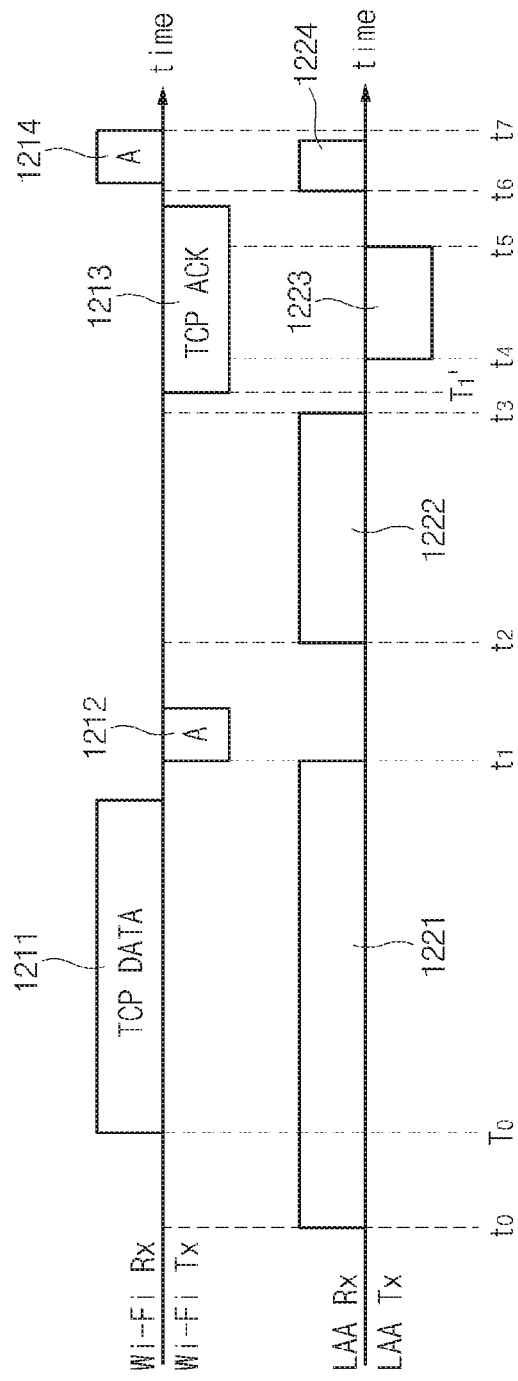

FIGS. 12A and 12B illustrate adjusting a time when transmission of a data packet is started, in consideration of a TCP ACK packet according to various embodiments of the present disclosure.

Referring to FIG. 12A, an electronic device according to an electronic device may receive a data packet 1221 during an interval between $t_0$ and $t_1$, may receive a data packet 1222 during an interval between $t_2$ and $t_3$, and may receive a data packet 1223 during an interval between $t_4$ and $t_5$, via an LAA module (an example of a second communication module) which uses an LAA protocol.

According to an embodiment, a Wi-Fi module (an example of a first communication module) of the electronic device may receive, for example, a TCP data packet 1211 from an external device at time $T_0$. If receiving the TCP data packet 1211, the Wi-Fi module may transmit a MAC ACK packet 1212 corresponding to the TCP data packet 1211 to the external device. The electronic device may transmit a TCP ACK packet 1213 at time $T_1$ and may receive a MAC ACK packet 1214 corresponding to the TCP ACK packet 1213. In this case, an interval where the TCP ACK packet 1213 is transmitted may be overlapped with, for example, part of an interval where the data packet 1222, received via the LAA module, is received. Further, an interval where the MAC ACK packet 1214 corresponding to the TCP ACK packet 1213 is received may be overlapped with part of an interval where the data packet 1223, transmitted via the LAA module, is transmitted.

Referring to FIG. 12B, according to an embodiment, the transmitted TCP ACK packet 1213 may be temporarily stored in a buffer included in the Wi-Fi module. A processor (e.g., a Tx/Rx timing adjusting module) of the electronic device may verify presence, a size, a characteristic, and the like of the TCP ACK packet 1213 from a status of the buffer included in the Wi-Fi module.

According to an embodiment, if the TCP ACK packet 1213 is verified, the processor may obtain transmission/reception scheduling information of the data packets 1221 to 1224 which are received or will be received via the LAA module. According to another embodiment, after obtaining the scheduling information of the data packets 1221 to 1224, which are received or will be received via the LAA module, in advance, the processor may verify the TCP ACK packet 1213.

According to an embodiment, the processor may adjust a time when transmission of the TCP ACK packet 1213 is started, such that an interval where the TCP ACK packet 1213 is transmitted is not overlapped with an interval where each of the data packets 1222 and 1224 is received, based on the scheduling information. As an example, the processor may delay a time when transmission of the TCP ACK packet 1213 is started to time $T_1'$. Time $T_1'$ when the transmission of the TCP ACK packet 1213 is started may be determined such that the interval where the TCP ACK packet 1213 is transmitted is not overlapped with the interval where each of the data packets 1222 and 1224 is received and such that the MAC ACK packet 1214 corresponding to the TCP ACK packet 1213 is not overlapped with an interval where the data packet 1223 is transmitted.

As the time when the transmission of the TCP ACK packet 1213 is started is determined as time $T_1'$, the transmission of the TCP ACK packet 1213 may fail be accomplished concurrently with the reception of the data packet 1222 and the reception of the MAC ACK packet 1214 may fail to be accomplished concurrently with the transmission of the data packet 1223. Unless the TCP ACK packet 1213 is transmitted over the same frequency band and the same channel, it may be accomplished concurrently with the transmission of the data packet 1223.

According to various embodiments of the present disclosure, a plurality of communication modules which use a common frequency band and comply with different communication protocols may fail to interfere with each other and may reduce at least part of interference in transmitting and receiving each data packet. Thus, more efficient communication may be performed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a first communication module;
   a second communication module;
   a processor electrically connected with the first communication module and the second communication module; and
   a memory electronically connected with the processor, the memory storing instructions that, when executed, cause the processor to:
   verify a first data packet to be transmitted via the first communication module;
   obtain scheduling information of a second data packet received via the second communication module;
   fragment the first data packet into a first fragmented data packet and a second fragmented data packet; and
   adjust a time when transmission of the second fragmented data packet is started based on the scheduling information.

2. The electronic device of claim 1, wherein the memory further stores instructions that, when executed, cause the processor to adjust the time when the transmission of the second fragmented data packet is started, such that an interval where the first data packet is transmitted is not overlapped with an interval where the second data packet is received.

3. The electronic device of claim 1, wherein the memory further stores instructions that, when executed, cause the processor to adjust the time when the transmission of the second fragmented data packet is started further based on a characteristic of the first data packet.

4. The electronic device of claim 3, wherein the memory further stores instructions that, when executed, cause the processor to, if the first data packet is a delay-sensitive data packet, adjust the time when the transmission of the second fragmented data packet is started within a specified time range.

5. The electronic device of claim 1, wherein the memory further stores instructions that, when executed, cause the processor to:
   fragment the first data packet further into more than two data packets; and
   adjust a time when transmission of each of the more than two fragmented data packets is started, such that an interval where each of the more than two fragmented data packets is transmitted is not overlapped with an interval where the second data packet is received based on the scheduling information.

6. The electronic device of claim 5, wherein the first data packet corresponds to a data packet comprising a size of a specified value or more.

7. The electronic device of claim 1, wherein:
   the first communication module is configured to receive an acknowledge (ACK) packet in response to the transmission of the first data packet, and
   the memory further stores instructions that, when executed, cause the processor to:
   if a third data packet to be transmitted via the second communication module is verified, obtain scheduling information of the third data packet; and
   adjust the time when the transmission of the second fragmented data packet is started, such that an interval where the ACK packet is received is not overlapped with an interval where the third data packet is transmitted, based on the scheduling information of the third data packet.

8. The electronic device of claim 1, wherein the memory further stores instructions that, when executed, cause the processor to, if an interval where the first data packet is transmitted is inevitably overlapped with an interval where the second data packet is received, adjust the time when the transmission of the second fragmented data packet is started based on transmission properties of the first data packet or the second data packet.

9. The electronic device of claim 8, wherein the transmission properties of the first data packet or the second data packet comprise at least one of an amount of transmission of the first data packet or the second data packet, communication quality of the first data packet or the second data packet, or a transmission speed of the first data packet or the second data packet.

10. The electronic device of claim 1, wherein the first communication module comprises a wireless-fidelity (Wi-Fi) module.

11. The electronic device of claim 1, wherein the second communication module comprises a communication module that uses an unlicensed band.

12. The electronic device of claim 1, wherein the second communication module comprises a long term evolution-unlicensed (LTE-U) module or a licensed assisted access (LAA) module.

13. The electronic device of claim 1, wherein the first communication module or the second communication module is configured to use a common frequency band.

14. The electronic device of claim 1, wherein the processor is implemented to be included in at least one of an application processor (AP) or a communication processor (CP).

15. The electronic device of claim 1, wherein the first communication module comprises:
    a buffer configured to temporarily store the first data packet, and
    wherein the processor verifies the first data packet based on a status of the buffer.

16. A communication method of an electronic device, the method comprising:
    verifying a first data packet to be transmitted via a first communication module;
    obtaining scheduling information of a second data packet received via a second communication module;
    fragment the first data packet into a first fragmented data packet and a second fragmented data packet; and
    adjusting a time when transmission of the second fragmented data packet is started based on the scheduling information.

17. The method of claim 16, wherein the adjusting of the time when the transmission of the second fragmented data packet is started comprises:
    adjusting the time when the transmission of the second fragmented data packet is started, such that an interval where the first data packet is transmitted is not overlapped with an interval where the second data packet is received.

18. The method of claim 16, wherein the adjusting of the time when the transmission of the second fragmented data packet is started comprises:
    if an interval where the first data packet is transmitted is inevitably overlapped with an interval where the second data packet is received, adjusting the time when the transmission of the second fragmented data packet is started based on transmission properties of the first data packet or the second data packet.

19. The method of claim 16, further comprising:
    fragmenting the first data packet further into more than two data packets,
    wherein the adjusting comprises:
        adjusting a time when transmission of each of the more than two fragmented data packets is started, such that an interval where each of the more than two fragmented data packets is transmitted is not overlapped with an interval where the second data packet is received based on the scheduling information.

20. The method of claim 16, wherein the first communication module or the second communication module is configured to use a common frequency band.

* * * * *